(12) United States Patent
Jiang

(10) Patent No.: US 7,726,833 B2
(45) Date of Patent: Jun. 1, 2010

(54) DEVICE AND METHOD FOR GENERATING STABLE, CONSISTENT, AND HIGH INTENSITY OBLONG LIGHT

(76) Inventor: Liansheng Jiang, 3111 Sunset Blvd. Suite V, Rocklin, CA (US) 95765

( * ) Notice: Subject to any disclaimer, the term of this patent is extended or adjusted under 35 U.S.C. 154(b) by 259 days.

(21) Appl. No.: 11/977,766

(22) Filed: Oct. 26, 2007

(65) Prior Publication Data

US 2009/0109665 A1    Apr. 30, 2009

(51) Int. Cl.
*F21V 19/02*    (2006.01)
*F21S 4/00*    (2006.01)

(52) U.S. Cl. .................. 362/220; 362/217.01; 362/223; 362/217.02; 362/217.08; 362/317; 362/285

(58) Field of Classification Search ................. 362/217, 362/220, 221, 222, 223, 285, 286, 296, 300, 362/305, 306, 307, 217.01, 217.02, 217.08, 362/317

See application file for complete search history.

(56) References Cited

U.S. PATENT DOCUMENTS

| | | | | |
|---|---|---|---|---|
| 6,632,001 B2 * | 10/2003 | Chen | ........................ | 362/222 |
| 6,945,671 B1 * | 9/2005 | Swarens et al. | ............. | 362/233 |

* cited by examiner

*Primary Examiner*—Jacob Y Choi
(74) *Attorney, Agent, or Firm*—Dahyee Law Group; Leon E. Jew

(57) ABSTRACT

The invention teaches a new method to provide lighting for photography and other purposes. A consistent, stable, high intensity line-light source is created by using a cylindrical lens and a line-light source using feedback control. The positioning of the line-light source is adjustable to produce parallel, convergence, and divergence beams depending on the desired lighting characteristics. The invention also teaches a new apparatus using the current invention.

20 Claims, 4 Drawing Sheets

DEVICE AND METHOD FOR GENERATING STABLE, CONSISTENT, AND HIGH INTENSITY OBLONG LIGHT

BACKGROUND OF THE INVENTION

1. Technical Field of the Invention

The present invention generally relates to the field of high intensity lighting devices for use in photography and other purposes. More particularly, the invention relates to a consistent, stable, and high intensity oblong light source, and the method for creating the same.

2. Description of the Related Art

Controllable, high intensity oblong light is applied in many fields, especially in the field of photography. The photography involved in image processing and image inspection mostly requires controllable high intensity oblong lights. For example, the present invention can be used for line-scan camera photography.

Unstable or low intensity lights usually result in photographed images of inferior quality with poor contrast, stability and repeatability. Thus, the intensity, consistency, and stability of the light should be maintained at a high level to insure high image quality. The prior art method of obtaining uniform light-intensity is by manually adjusting the electric current/voltage supplied to the line-light source. However, changing properties occurring in the lighting device such as the heating up of the light bulb, the variance in the output of the power supply, the aging of the line-light source, and other such factors would result in altered light-intensity output given a constant power input.

In photography, images are taken under varying conditions. In order to select proper light-intensity for the particular photograph, light-intensity must be adjusted instantaneously during auto photography, but the current light fittings on the market cannot offer the function of adjusting light intensity instantaneously.

The image acquisition and image inspection industries commonly use line scan photography, which always requires stable, high-intensity, convergent oblong light. Also, for optimized image processing and image inspection of the photographed images, the inspected materials are required to be clear and the images of the non-inspected materials should not to be taken. The parallel or convergence oblong light is the best solution since it may set to illuminate only the desired objects. Lately, LEDs have been used to obtain a high-intensity oblong line-light source for photography, but these line-light sources are low in light-intensity and cannot obtain images from longer distances.

Currently, there is no existing art or technology capable of generating an oblong LED line-light source with a range of 50 mm-500 mm (the distance between the inspected objects to the light). And generally, the line-light source equipment is borrowed from photographing equipment of other applications or is simply refitted equipment. Due to poor lighting equipment, the photography process is not optimal. For example, the use of LEDs as the oblong line-light source can only be implemented at close range (within 50 mm-100 mm). If general lamps or iodine-tungsten lamps with an open ended light width adjustor are used as a line-light source, then the shape of the emitted light would not be controlled and the intensity of the light would be unstable.

What is desired is a method for creating a uniform beam of high intensity oblong light which quickly reaches and maintains a selectable preset light intensity.

SUMMARY OF THE INVENTION

The invention involves a method and apparatus for generating controllable, high intensity oblong light. A typical apparatus embodiment includes an enclosure with an oblong opening and at least one cylindrical lens mounted to the enclosure. Inside the enclosure, there is a line-light source fixed on a bracket in parallel with the cylindrical lens and located near the focal line of the cylindrical lens. At least one light intensity sensor is placed near the line-light source or on the surface to be illuminated.

The light emitted from the light source passes through the cylindrical lens in order to generate a focused oblong light beam of high intensity and long range. The intensity of the focused oblong light generated by the invention is 2-5 times stronger than the normal line-light source of existing techniques, and the effective distance is 5-10 times longer than the normal line-light source of existing techniques. The formula of the light-intensity on the equipment of the invention (derived from testing results) is:

$$I = i/r \qquad (A)$$

where i is the intensity of the lights, r is the distance from the lights, I is the intensity from r.

But the normal lights formula is $$I = i/r\text{·sup·}2 \qquad (B)$$

Here, the light-intensity generated by the current invention is much higher across a distance when compared to normal lights.

The invention utilizes a control unit which allows the user to preset the line-light source intensity and maintains the preset light intensity despite changing properties which may otherwise affect light intensity output. Concurrently, the control unit receives feedback from optical sensors which detects light intensity. The control unit then adjusts the power supplied to the line-light source according to the difference between current light-intensity value and the preset light intensity value. This closed loop control will be repeated while the light is on. Thus, the intensity of the oblong light can be set according to the user's requirements and can auto regulate to keep the light-intensity stable.

The resulting oblong light generated by the invention emits a light beam of higher intensity and longer range than current techniques. The control system allows for increased light intensity stability and instantaneous light intensity adjustments. The invention generates three types of oblong beams: parallel (when the line-light source is positioned on the focal line of the cylindrical lens), divergence (when the line-light source is placed between the focal line and the cylindrical lens), and convergence (when the line-light source is positioned behind the focal line of the cylindrical lens). These three types of oblong light are essential in photography. Parallel oblong light keeps light emitted at a constant width (roughly equal to the width of the cylindrical lens) and is essential for image processes that require the light to illuminate only on the desired objects. Divergence oblong light can be used on advertising boards. Convergence oblong light can be used for line-scan camera photography.

DETAILED DESCRIPTION OF THE INVENTION

Figure 1:
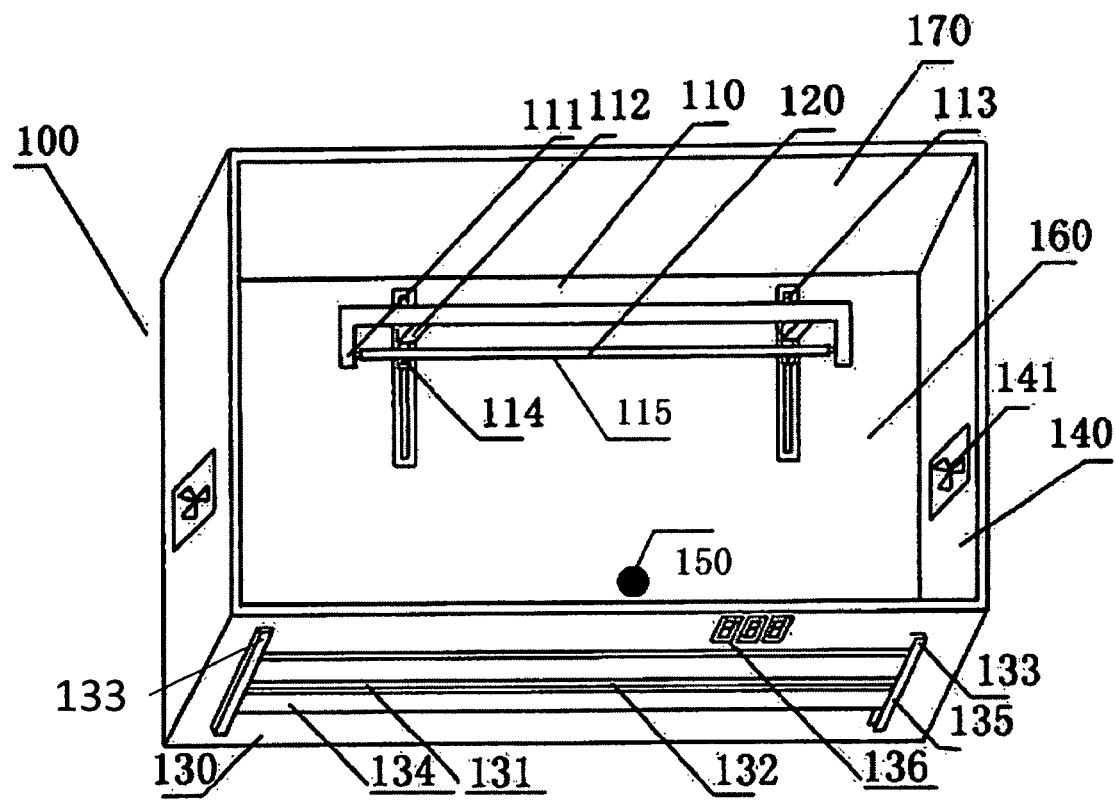
FIG. 1 is a schematic perspective diagram illustrating a preferred embodiment of the invention.

FIG. 1 is a schematic diagram illustrating an apparatus embodiment according to the current invention. A typical apparatus embodiment of the current invention utilizes a cuboids shaped enclosure 100. However, the enclosure to the invention may be made in any shape. A typical embodiment of the interior surface of the enclosure can be lined with either a light reflective or light absorptive material depending on the desired projected light properties of the current invention. A light absorptive surface is desired for creating a beam which is more sensitive to adjustments to form parallel, convergent, or divergent beams of light. In a typical embodiment, slots 113 placed on the bottom wall 160 of the enclosure 100 allow the position of the line-line-light source to be adjusted. The light source 120 is coupled to the supporting frame 110. A diffuser 115 is coupled the light source 120. A slider 112 is placed such that it can slide along the slot with a fastener 114 which will keep the sliders stationary once the slider 112 is placed at its desired position in the slot 113. A line light holder 111 is attached to the slider 112 and holds the line light in place. In another embodiment, the line-light source adjustment uses a threaded adjustment mounted to the back wall 170 of the enclosure 100 and coupled to a bracket holding the line-light source. Cooling fans 141 may be placed on the enclosure to keep electronics cool. These fans may be placed on the side walls 140 of the enclosure 100. In the front panel 130, there are an oblong hole 131, a cylindrical lens 132 mounted to the oblong hole 131, two blind brackets 133, rectangular blinds 134, a blind fastener 135, and a digital display and control panel 136. There are two light intensity sensors, the first one is installed in the position 150, and the second one is installed in the position 180.

Figure 2:
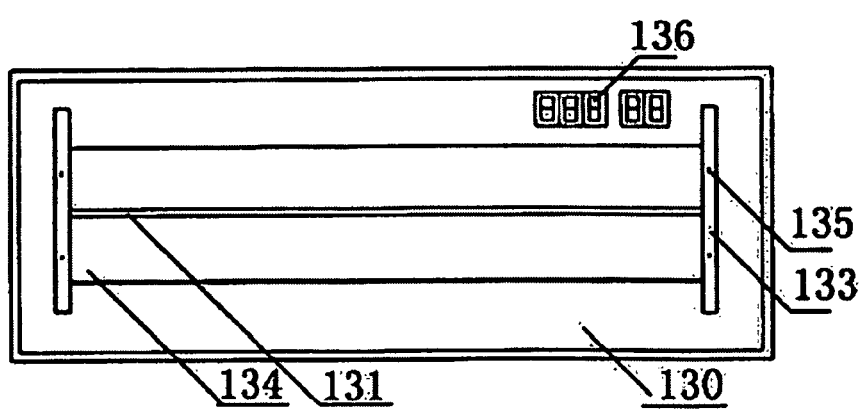
FIG. 2 is a schematic diagram illustrating a front view of the front panel of the embodiment according to FIG. 1.
Figure 5A:
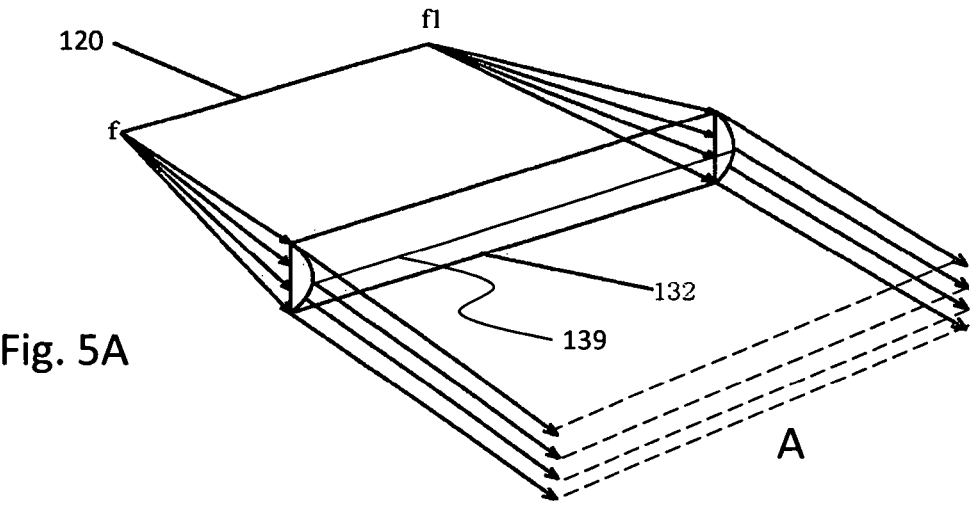
FIGS. 5A-5C are schematic diagrams that respectively illustrate the parallel, converge and diverge beams produced by the cylindrical lens according to the current invention.
Figure 5B:
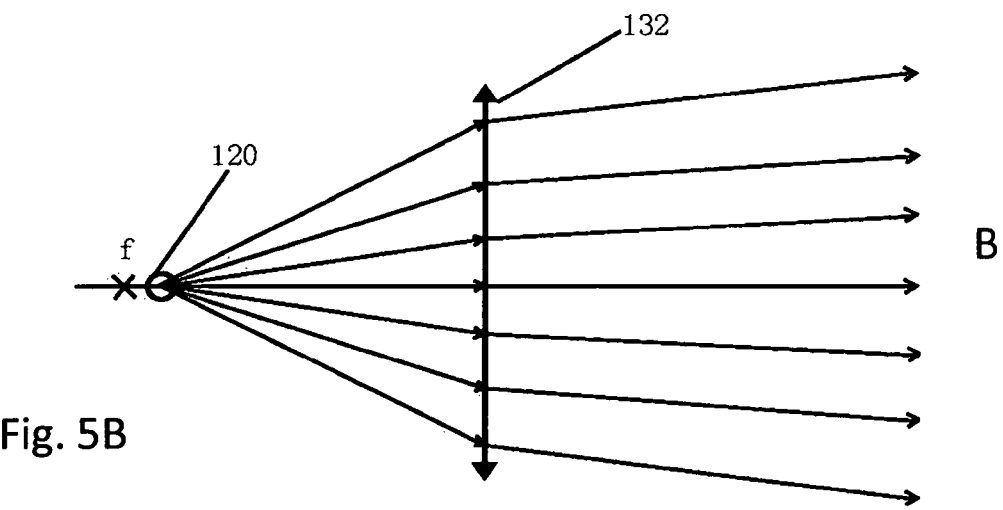
Figure 5C:
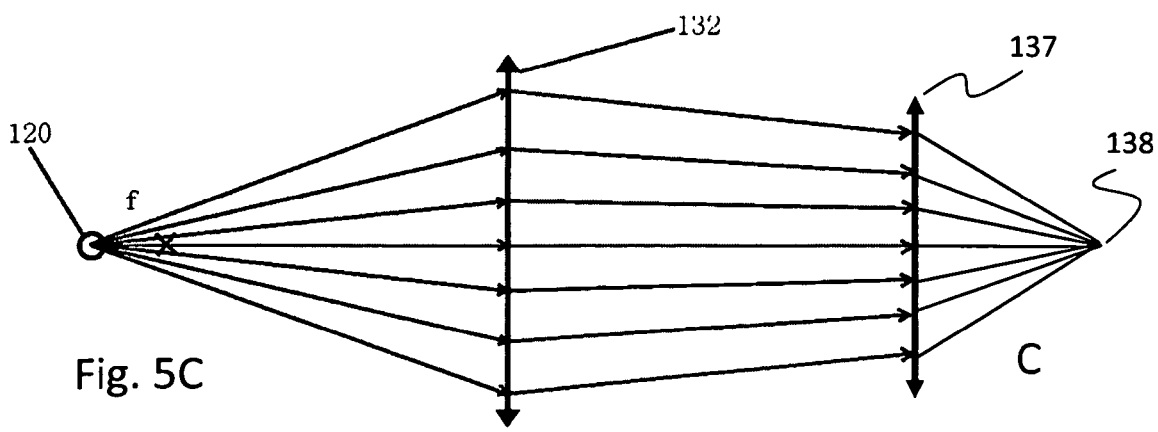

FIG. 2 is a schematic diagram illustrating a typical configuration of the front panel 130 of the embodiment according to FIG. 1. Now referring to both FIG. 1 and FIG. 2, the cylindrical lens 132 is mounted to the oblong hole 131. The cylindrical lens 132 has a focal line and an axis of curvature. As an example, the cylindrical lens 132 shown here has only one axis of curvature and is oriented horizontally. Other embodiments may orient the cylindrical lens in any other direction according to the application. Since the cylindrical lens has more than one focal point as shown in FIG. 5A, FIG. 5B and FIG. 5C where "f" refers to focal point, its foci form a line segment parallel to the cylindrical lens' axis of curvature. Referring to FIG. 5A, the line-light source 120 is located on or close to the focal line f-f1 of the cylindrical lens 132. The line-light source 120 is parallel to the axis 139 of the cylindrical lens 132. Referring back to FIG. 2, the rectangular blinds 134 cover the oblong hole and are adjustable to accommodate different lenses or to control width of the projected light. A blind fastener 135 is used in conjunction with a blind bracket 133 to hold the blinds in place. A digital display and control panel 136 is used for adjusting and displaying light intensity. A typical embodiment uses an LCD display and digital controls on user interface. Preset points and buttons on the front panel of the enclosure or buttons on user interface to allow user to adjust preset points.

Using the display and controls 136 the device according to the invention is capable of adjusting light-intensity automatically when the light turns on. The current embodiment of the invention places a digital display of the light intensity preset unit on the enclosure. The PC connector and power connector are also placed on the enclosure. The control system adjusts power output to the bulb for maintaining the selected light-intensity. Temperature changes, the age of the apparatus, and various other factors will change the intensity of the light emitted from the line-light source given the same input power level. The control system described in this invention keeps the light intensity constant despite property changes which affect outputted light intensity.

The line-light source 120 is placed parallel to and near the focal line of the cylindrical lens 132. The line-light source's position is adjustable by the focal line, toward and away from the cylindrical lens 132, for producing parallel, converge, and diverge beams. In particular, the position of the line light 120 can be adjusted to move directly towards or away from the cylindrical lens 132 on the plane perpendicular to the surface of the lens and passing through the focal line of the cylindrical lens 132. The purpose is to allow the apparatus to be adjusted so the three forms of projected oblong light, i.e. parallel, divergence or convergence oblong beams, can be obtained. When the line-light source 120 coincides with the focal line of the cylindrical lens 132, parallel beams are produced. When the line-light source 120 is positioned between the cylindrical lens 132 and its focal line, divergent beans are produced. When the line-light source 120 moves away from the focal line of the cylindrical lens 132 such that the focal line falls in between the line-light source 120 and the cylindrical lens 132, convergent beams are produced. In a typical embodiment, the line-light source 120 can be a tube shaped light bulb. The light bulb may be clouded for diffusing the emitted light. In another embodiment, a diffuser can be added as a separate piece coupled to the line-light source 120. The line-light source can be an iodine-tungsten lamp, LEDs, or any other device which emits light. The line-light source can be several individual lighting units arranged in a straight line or is a single lighting unit shaped as a tube. The line-light source is mounted to a bracket and is located near the focal line of the cylindrical lens and is oriented parallel to the cylindrical lens. As shown in FIG. 5C, one or more additional cylindrical lenses, such as the second cylindrical lens 137, may be added in front of the first cylindrical lens 132 with the focal line of the second cylindrical lens near or on the first cylindrical lens. This embodiment will make the projected light more uniform in intensity across the desired area to be lighted.

In a typical embodiment, the line-light source 120 can be an iodine-tungsten lamp, LEDs, or any other device which emits light. The line-light source 120 can be several individual lighting units arranged in a straight line or is a single line-light source shaped as a tube. The line-light source 120 is mounted to a bracket and is located near the focal line of the cylindrical lens 132 and is oriented parallel to the cylindrical lens 132. Additional cylindrical lenses, such as the second cylindrical lens 137 shown in FIG. 5C, may be added in front of the first cylindrical lens 132 with the focal line of the second cylindrical lens 137 near or on the first cylindrical lens. This embodiment will make the projected light more uniform in intensity across the desired area to be lighted. Also, a light shield with an oblong hole placed between the line-light source and the cylindrical lens can be used to create a more uniform light beam.

In the typical embodiment, as shown in FIG. 1, one or more light intensity sensors, such as the light sensor 150, are located inside the enclosure 100 and attached to the line-light source 120 such that the sensor's relative position to the line-light source 120 is remains the same even when the positioning of the line-light source 120 is adjusted relative to the cylindrical lens 132. This allows for consistent light intensity from the line-light source 120 even when the projected light beam adjustments are being made. In another embodiment, one or more light intensity sensors, such as the light sensor 180, are placed next to the cylindrical lens 132. The purpose of this embodiment is to maintain a consistent light intensity at the lens when the projected light beam is being adjusted. As the line-light source 120 is adjusted to move farther away from the lens, the light intensity would increase to compensate for the distance and vice versa. Yet in another embodiment, the light intensity sensors may be located near or on an area, a surface, or an object to be illuminated. This embodiment in conjunction with the control system allows for consistent lighting despite changing ambient light, changing reflective characteristics of the surface to be illuminated, or changing reflective characteristics of the environment. In another embodiment, more than one light intensity sensor is placed on the surface to be illuminated in different places and will work in conjunction with the control system. The control system will compare the light intensity reading of each individual setting and change the line-light source's position relative to the cylindrical lens focal line as well as the power output to the line-light source to achieve uniform light intensity readings from all the light intensity sensors.

The control unit may be located inside the enclosure, but can also be attached as a separate unit. The control unit includes a microcontroller which may use an integrated analog digital converter (ADC), and outputs pulse width modulation (PWM) or digital analog converter (DAC) or other input processing and output control system.

The light-intensity preset unit allows the user to preset the light-intensity digitally. The control unit turns on the oblong lights according to the preset value by outputting the PWM or DAC signal to power the line-light. Then the control unit reads the optical sensor signal (initially an analog signal, then converted into a digital signal through the A/D converter), compares the optical sensor value with user's preset light-intensity digital value, and then utilizes proportional-integral-derivative (PID) control to adjust the PWM for DAC signal to deliver the appropriate light-intensity. The control loop is repeated when the light is turned on. The equipment allows the user to change light-intensity set point instantaneously when the power supply is turned on and the control unit is activated.

A typical embodiment of the circuit control unit uses PID control. This control loop feedback mechanism attempts to correct the error between the light intensity sensor reading and the desired light intensity setting by calculating and then outputting a corrective action that can adjust the process accordingly. The PID controller calculation involves three separate parameters; the Proportional, the Integral and Derivative values. The Proportional value determines the reaction to the current error, the Integral determines the reaction based on the sum of recent errors and the Derivative determines the reaction to the rate at which the error has been changing. The weighted sum of these three actions is used to adjust the light intensity of the line-light source via the controller's power output to the line-light source.

Figure 3:
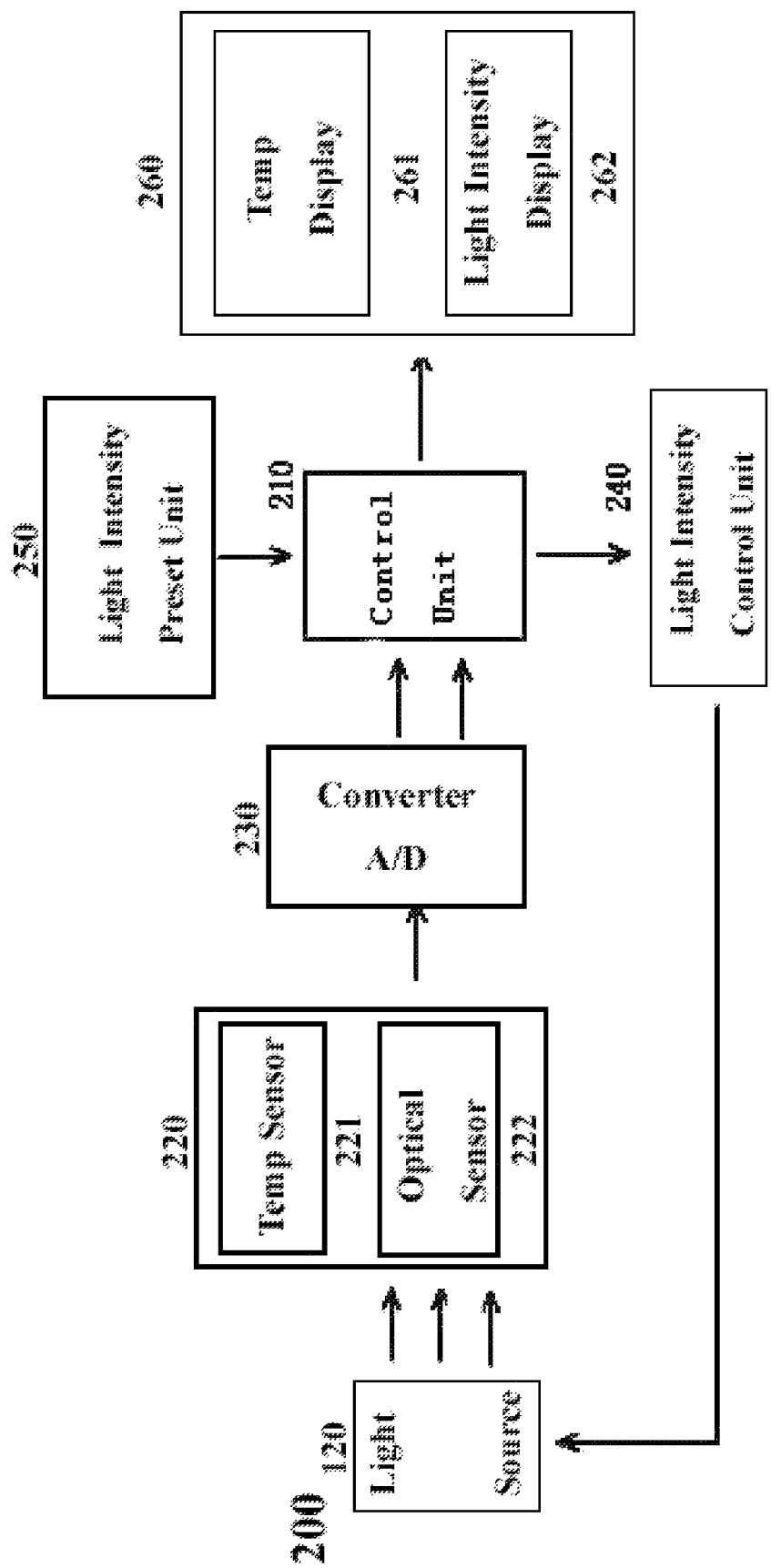
FIG. 3 is a flow diagram illustrating the light intensity control system used in the invention.

FIG. 3 is a flow chart diagram of the circuit control unit 200 according to the invention. The circuit control unit 200 (connected with power supply) can be located inside or outside of the equipment. The circuit control unit 200 comprises a microcontroller 210, an optical sensor unit 220, an A/D conversion unit 230 (which can be integrated within the microcontroller 210), a light-intensity adjusting unit 240 (which is triggered by a PWM or DAC signal from microcontroller 210), a light-intensity preset unit 250, and a display unit 260. Therein, the optical sensor unit 220 is electronically coupled to the A/D conversion unit 230. The A/D conversion unit 230, the light-intensity preset unit 250, the light-intensity adjusting unit 240 and the display unit 260 are electronically coupled to the microcontroller 210 respectively. The sensor unit 220 (which includes an optional temperature sensor 221 and optical sensor 222) is used to feedback the temperature and the light-intensity data (through A/D conversion unit 230) to the microcontroller 210. The A/D conversion unit 230 is an A/D conversion chip or can be integrated in the microcontroller 210. After it converts the received temperature and light-intensity analog signals into digital signals, the microcontroller 210 receives the signals. Then the microcontroller 210 adjusts the PWM or DAC to trig the light-intensity adjusting unit 240 for any changes in the DC power on the line-light source 120 after comparing the received feedback optical sensor value with the light-intensity preset value from preset unit 250 in order to match these two values. The microcontroller 210 turns off the lights as soon as the temperature sensor value exceeds the preset constant interlock value (typically is 60° C.). The microcontroller 210 transmits the current light-intensity and temperature values to the display unit 260 (which can be liquid crystal display or regular LED display, and may further include an optional temperature display 261 and an light-intensity display 262). The light-intensity preset unit 250 can be set manually through buttons or through user interface on a host PC.

Figure 4:
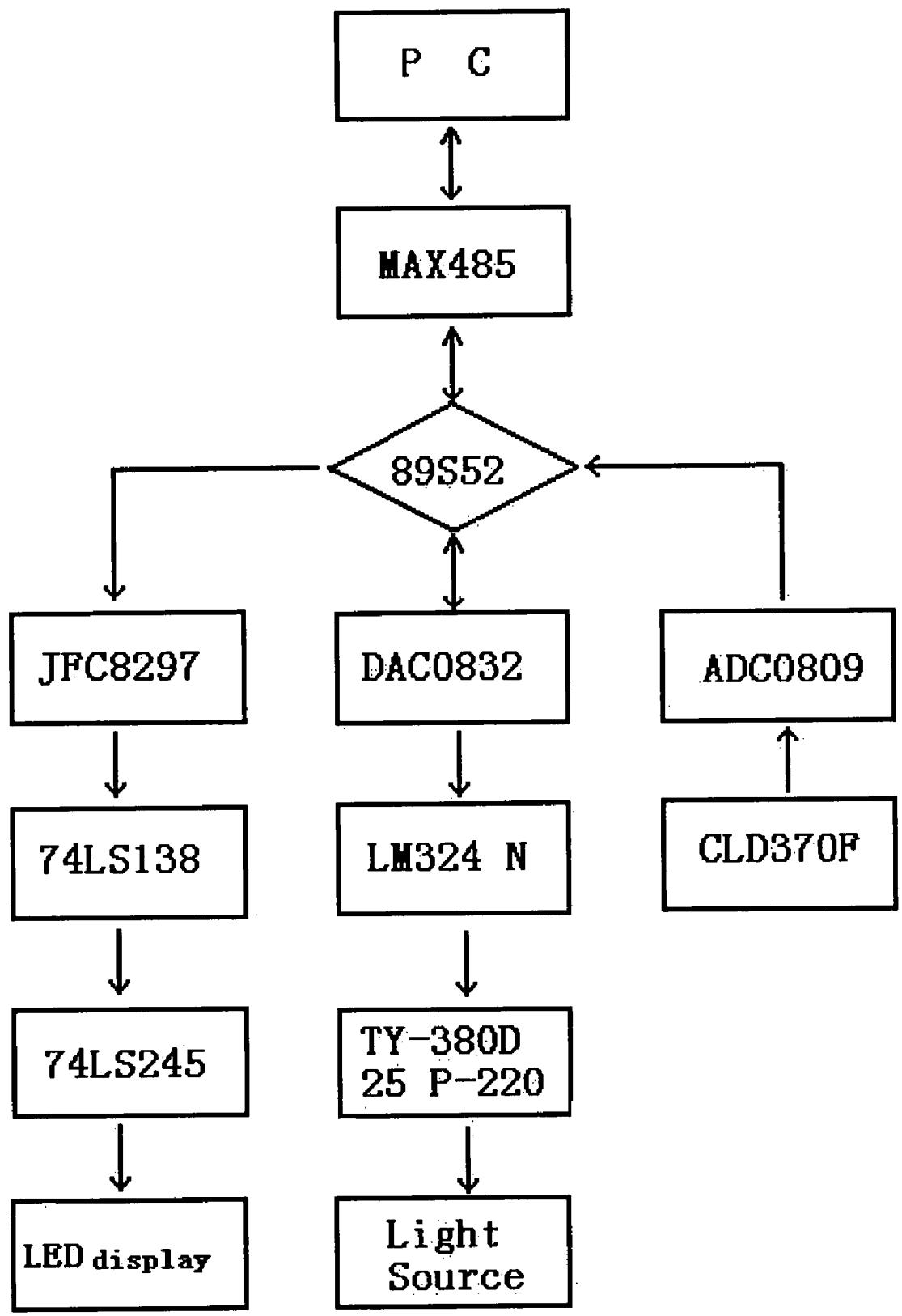
FIG. 4 is a block flow diagram illustrating an exemplary hardware control system according to the current invention.

FIG. 4 is a detailed example of the hardware control flow diagram according to the invention. The hardware can be varied depending on selection of microcontroller and other ICs. Optical sensor CLD370F converts the optical signals, from the line-light source, into electric signals to be transmitted to the D/A conversion chip ADC0809. After the D/A conversion, the digital signals are fed back into the SCM 89S52. The signals transacted by the SCM are transmitted in two ways concurrently.

The first way transmits the exported signals into D/A conversion chip DAC0832. The D/A conversion chip DAC0832 exports the signals into the light-intensity regulation module in order to adjust the light-intensity after converting the digital signals into analog control signals. The signals are magnified by operational amplifier LM324N. In the example, the stated optional light-intensity regulation module (that works with DAC; when using PMW, the module is replaced by an amplifier to supply the DC power directly on the line-light) is a voltage-adjusting module TY-380D25P-2220.

The transmission signals of the second method make the module light-intensity and temperature value through display driver circuit JFC8279, bank select circuit 74LS138, and chip select circuit 74LS245. The current light-intensity value and temperature value are displayed through the nixie tubes. In the example, the light-intensity is fixed through PC and connected with SCM through serial-port communication chip MAX485. The control unit can be connected to other chips or circuits.

FIG. 5A, FIG. 5B, and FIG. 5C illustrate how changing the distance between line-light source 120 and direct lens 132 to make the distance equal to, less than, or more than the distance between "f" (the focus of cylindrical lens) and cylindrical lens 132. In these ways, the line-light that passes through the cylindrical lens 132 is focused into different types of light beams. When the line-light source 120 coincides with the focal line f-f1, parallel beams "A" are produced. When the line-light source 120 is positioned between the focal line f-f1 and the cylindrical lens 132, divergent beans "B" are produced. When the line-light source 120 moves away from the focal line f-f1 such that the focal line f-f1 falls in between the line-light source 120 and the cylindrical lens 132, convergent beams "C" are produced. These three types of light beams have different uses in photography. Parallel oblong light beams emit light at a constant width which is approximately equal to the width of the cylindrical lens 132. It is essential for image processes that require the light to irradiate only on the desired objects. Divergent oblong light beams can be used on advertising board. Convergent oblong light beams can be used for line-scan camera photography. Note that in FIG. 5C, as an optional configuration, a second cylindrical lens 137 is used. The focal line of the second cylindrical lens 137 coincides with axis 139 of the first cylindrical lens 132. In this way, high intensity oblong light beam 138 is produced.

While one or more embodiments of the present invention have been illustrated in detail, the skilled artisan will appreciate that modifications and adoptions to those embodiments may be made without departing from the scope and spirit of the present invention as set forth in the following claims.

The invention claimed is:

1. An apparatus for creating a consistent, stable, and high intensity oblong light comprising:
   a cylindrical lens;
   a line-light source being placed in parallel to said cylindrical lens;
   a light intensity sensor which detects light intensity of said line-light source;
   a control system which controls light intensity by adjusting power output to said line-light source based on a preset light intensity setting and feedback from said light intensity sensor;
   an enclosure having a low light reflective interior surface;
   wherein said enclosure contains said line-light source and said cylindrical lens; and
   wherein said line-light source's position relative to said cylindrical lens' focal line is adjustable, toward and away from said cylindrical lens, for producing parallel, converge, and diverge beams.

2. The apparatus of claim 1, wherein said light intensity sensor is fixed relative to said line-light source such that said light intensity sensor's distance to said line-light source does not change when positioning of said line-light source is adjusted.

3. The apparatus of claim 1, wherein said light intensity sensor is fixed on or near said cylindrical lens such that light intensity at said cylindrical lens is measured for feedback control of said line-light source light intensity.

4. The apparatus of claim 1, wherein said light intensity sensor is fixed on or near an area to be illuminated such that light intensity is measured at said area for feedback control of light intensity.

5. The apparatus of claim 1, further comprising:
   a second light intensity sensor fixed on or near a surface to be illuminated such that light intensity is measured at said surface to be illuminated for feedback control of light intensity in conjunction with other said light intensity sensor;
   wherein said control system adjusts light intensity of said line-light source and positioning of said line-light source relative to said cylindrical lens such that light intensity is uniform both where said light intensity sensor is placed and where said second light intensity sensor is placed.

6. The apparatus of claim 1, further comprising:
   a second cylindrical lens with an axis and a focal line is fixed parallel to said cylindrical lens such that light from said line-light source passes through said cylindrical lens before passing through said second cylindrical lens;
   wherein said focal line of said second cylindrical lens lies on or near said cylindrical lens.

7. The apparatus of claim 1, wherein said enclosure further comprises a light shield having an oblong opening of similar size and shape of said cylindrical lens;
   wherein said light shield is placed between said line-light source and said cylindrical lens;
   wherein said oblong opening, said line-light source, and said cylindrical lens all lie within a common plane.

8. The apparatus of claim 1, wherein said control system further comprises proportional-integral-derivative control.

9. The apparatus of claim 1, wherein said line-light source is a tube shaped bulb.

10. The apparatus of claim 1, wherein said line-light source further comprises a diffuser for evenly spreading light emitted from said line-light source.

11. A method for creating a consistent, stable, and high intensity light emission comprising the steps of:
    providing a cylindrical lens;
    providing a line-light source being placed in parallel to said cylindrical lens;
    providing a light intensity sensor which detects light intensity of said line-light source;
    providing a control system which controls light intensity by adjusting power output to said line-light source based on a preset light intensity setting and feedback from said light intensity sensor; and
    providing an enclosure having a low light reflective interior surface;
    wherein said enclosure contains said line-light source and said cylindrical lens;
    wherein said line-light source's position relative to said cylindrical lens' focal line is adjustable, toward and away from said cylindrical lens, for producing parallel, converge, and diverge beams.

12. The method of claim 11, wherein said light intensity sensor is fixed relative to said line-light source such that said light intensity sensor's distance from said line-light source does not change when positioning of said line-light source is adjusted.

13. The method of claim 11, wherein said light intensity sensor is fixed on or near said cylindrical lens such that light intensity at said cylindrical lens is measured for feedback control of said line-light source light intensity.

14. The method of claim 11, wherein said light intensity sensor is fixed on or near an area to be illuminated such that light intensity is measured at said area for feedback control of light intensity.

15. The method of claim 11, further comprising the step of:
    providing a second light intensity sensor fixed on or near a surface to be illuminated such that light intensity is measured at said surface to be illuminated for feedback control of light intensity in conjunction with other said light intensity sensor;
    wherein said control system adjusts light intensity of said line-light source and positioning of said line-light source relative to said cylindrical lens such that light intensity is uniform both where said light intensity sensor is placed and where said second light intensity sensor is placed.

16. The method of claim 11, further comprising the step of:
    providing a second cylindrical lens with an axis and a focal line is fixed parallel to said cylindrical lens such that light from said line-light source passes through said cylindrical lens before passing through said second cylindrical lens;

wherein said focal line of said second cylindrical lens lies on or near said cylindrical lens;

wherein said second cylindrical lens, said cylindrical lens, and said line-light source all lie within a common plane.

17. The method of claim 11, wherein said enclosure further comprises a light shield having an oblong opening of similar size and shape of said cylindrical lens; and wherein said light shield is placed between said line-light source and said cylindrical lens.

18. The method of claim 11, wherein said control system comprises proportional integral-derivative control.

19. The method of claim 11, wherein said line-light source is a tube shaped bulb.

20. The method of claim 11, wherein said line-light source further comprises a diffuser for evenly spreading light emitted from said line-light source.

* * * * *